US008243482B2

(12) United States Patent
Ueda et al.

(10) Patent No.: US 8,243,482 B2
(45) Date of Patent: Aug. 14, 2012

(54) CONTROL DEVICE FOR MATRIX CONVERTER

(75) Inventors: Yozo Ueda, Fukuoka (JP); Ryuji Suenaga, Fukuoka (JP); Eiji Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 18 days.

(21) Appl. No.: 12/955,921

(22) Filed: Nov. 30, 2010

(65) Prior Publication Data

US 2011/0116295 A1      May 19, 2011

Related U.S. Application Data

(63) Continuation of application No. PCT/JP2009/054316, filed on Mar. 6, 2009.

(30) Foreign Application Priority Data

May 30, 2008   (JP) .............................. P. 2008-142289

(51) Int. Cl.
*H02M 5/275* (2006.01)
*H02M 5/293* (2006.01)
(52) U.S. Cl. ....................................................... 363/163
(58) Field of Classification Search .................. 363/157, 363/159–160, 163–165
See application file for complete search history.

(56) References Cited

U.S. PATENT DOCUMENTS

| 5,852,559 A * | 12/1998 | Li ................................... 363/163 |
| 5,949,672 A * | 9/1999 | Bernet .......................... 363/163 |
| 7,626,840 B2 * | 12/2009 | Ueda ............................. 363/163 |
| 7,782,643 B2 * | 8/2010 | Hara et al. ...................... 363/50 |
| 2008/0130183 A1 * | 6/2008 | Kawashima ..................... 361/79 |
| 2008/0285314 A1 * | 11/2008 | Kojori ............................. 363/37 |
| 2008/0315819 A1 | 12/2008 | Ueda |

FOREIGN PATENT DOCUMENTS

| JP | 2007-166749 | 6/2007 |
| JP | 2007-300709 | 11/2007 |
| JP | 2007-306649 | 11/2007 |
| JP | 2008-048550 | 2/2008 |
| WO | WO 2006/035752 | 4/2006 |
| WO | WO 2007/094161 | 8/2007 |

OTHER PUBLICATIONS

Yusuke et al., Apr. 2007, IEEE, Power Conversion Conference 2007, PCC '07, pp. 769-775.*
International Search Report for International Application No. PCT/JP2009/054316, Jun. 2, 2009.
Written Opinion of the International Searching Authority for International Application No. PCT/JP2009/054316, Jun. 2, 2009.

* cited by examiner

*Primary Examiner* — Jue Zhang
(74) *Attorney, Agent, or Firm* — Ditthavong Mori & Steiner, P.C.

(57) ABSTRACT

A control device for a matrix converter includes an input voltage detector, an output current detector, a pulse width modulator, and an input voltage command calculator. The input voltage detector is configured to detect an input voltage of the matrix converter. The output current detector is configured to detect an output current of the matrix converter. The pulse width modulator is configured to generate a PWM pulse command signal by using the input voltage, the output current, and an output line voltage command. The input voltage command calculator is configured to calculate an input voltage command of the matrix converter.

25 Claims, 8 Drawing Sheets

CONTROL DEVICE FOR MATRIX CONVERTER

CROSS-REFERENCE TO RELATED APPLICATION

The present application is a continuation application of PCT/JP2009/054316, filed Mar. 6, 2009, which claims priority to Japanese Patent Application No. 2008-142289, filed May 30, 2008. The contents of these applications are incorporated herein by reference in their entirety.

BACKGROUND OF THE INVENTION

1. Field of the Invention

The present invention relates to a control device for a power converter.

2. Description of Related Art

A conventional power converter that performs AC-AC direct conversion may be a matrix converter. A control device for the matrix converter typically generates an output line voltage command $V_{ref}$ in the form of a pulse-width-modulation pulse (a PWM pulse), and controls the value of an output line voltage in accordance with an area of the PWM pulse, to cause an input current to approach a sine wave in accordance with a ratio of the PWM pulse.

For example, Japanese Unexamined Patent Application Publication No. 2007-166749 discloses a technique that corrects an error between an input current and an output voltage due to commutation of a main circuit semiconductor element, to decrease distortion of the output voltage and the input current.

SUMMARY OF THE INVENTION

According to one aspect of the present invention, a control device for a matrix converter includes an input voltage detector, an output current detector, a pulse width modulator, and an input voltage command calculator. The input voltage detector is configured to detect an input voltage of the matrix converter. The output current detector is configured to detect an output current of the matrix converter. The pulse width modulator is configured to generate a PWM pulse command signal by using the input voltage, the output current, and an output line voltage command. The input voltage command calculator is configured to calculate an input voltage command of the matrix converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
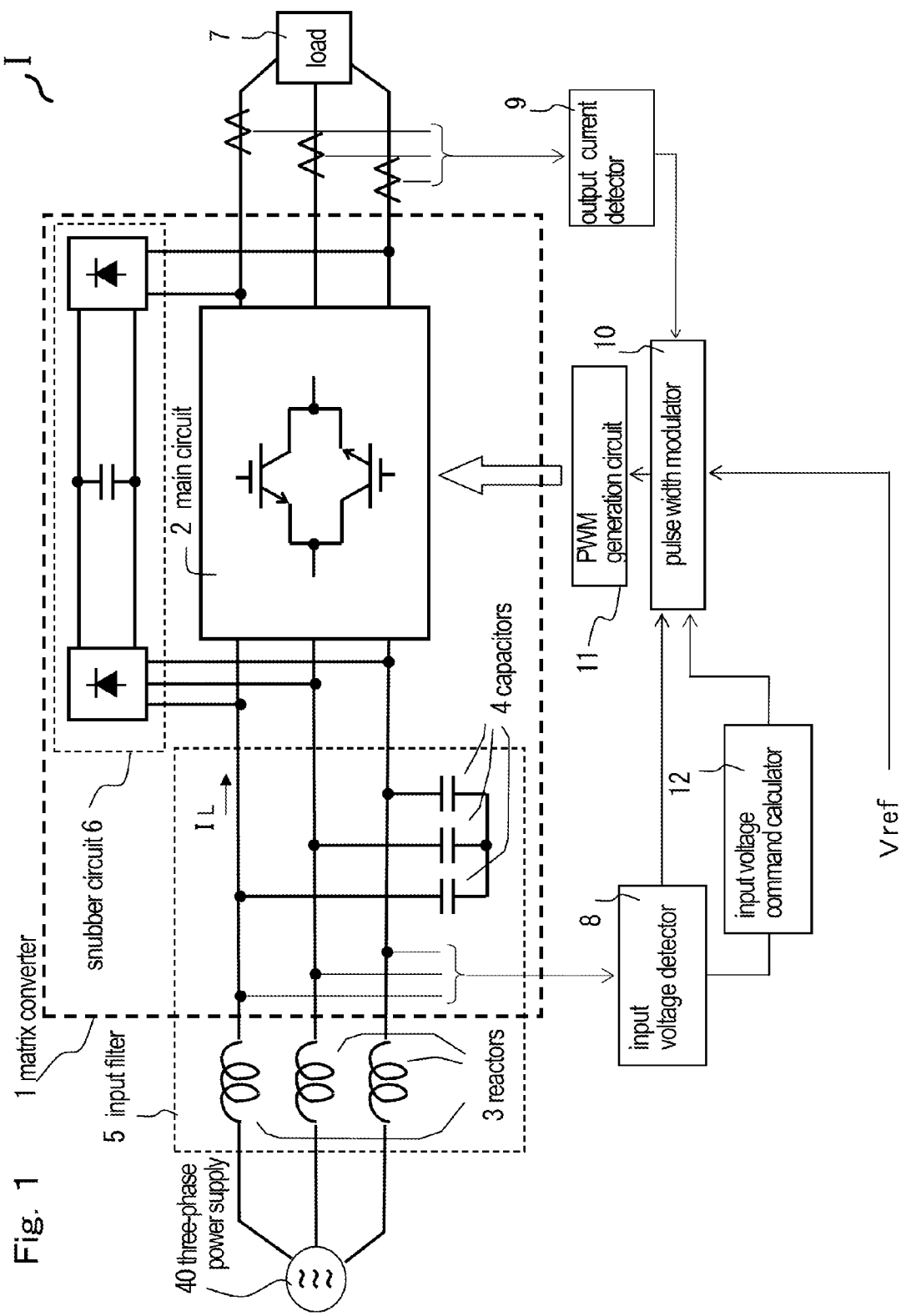
FIG. 1 is a block diagram showing a configuration of a control device for a matrix converter according to a first embodiment.

Embodiments will now be described with reference to the accompanying drawings, wherein like reference numerals designate corresponding or identical elements throughout the various drawings.

First, a control device for a matrix converter will be briefly described below.

Figure 8:
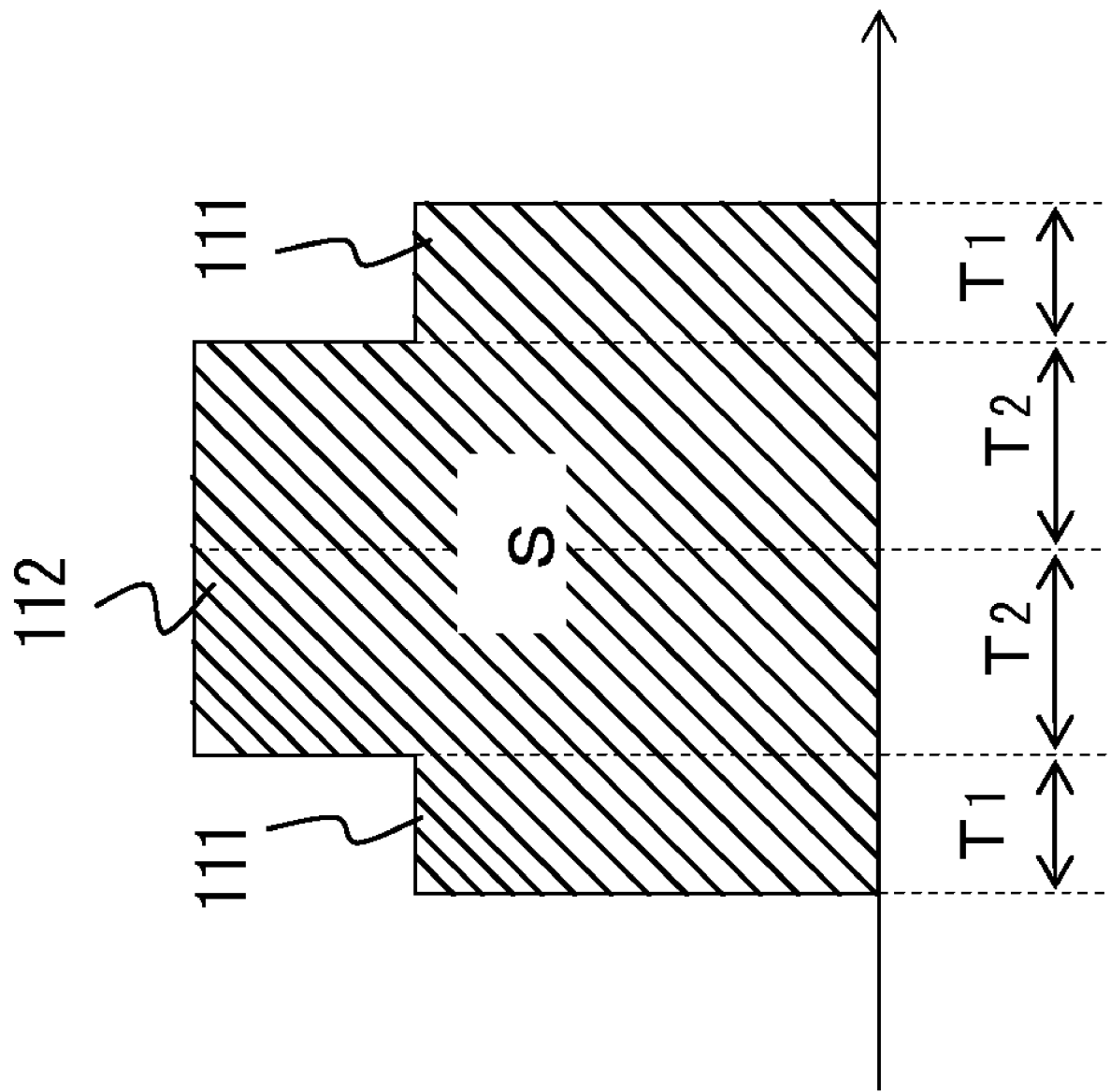
FIG. 8 illustrates a waveform of output voltages of a matrix converter.

FIG. 8 illustrates an output line voltage of a matrix converter, in the form of a PWM pulse.

Referring to FIG. 8, a pulse 111 is determined by a potential difference between a minimum potential phase and an intermediate potential phase, and a pulse 112 is determined by a potential difference between a minimum potential phase and a maximum potential phase. Reference sign S denotes the entire area of the PWM pulse, $T_1$ denotes ½ the width of the pulse 111, and $T_2$ is ½ the width of the pulse 112. The period of the pulse 111 corresponds to the minimum potential phase and the intermediate potential phase of an input, and the period of the pulse 112 corresponds to the minimum potential phase and the maximum potential phase of the input. Ratios a of the area S of the pulse to $T_1$ and to $T_2$ are varied to control the value of an output voltage and the form of an input current.

In the above description, the input potential phase during the period of the pulse 111 uses the pair of the intermediate potential phase and the minimum potential phase. Alternatively, a control device for a matrix converter may improve the waveform of an input current by selectively using a pair of an intermediate potential phase and a minimum potential phase, and a pair of the intermediate potential phase and a maximum potential phase.

First Embodiment

FIG. 1 is a block diagram showing a control device I for a matrix converter 1 according to a first embodiment of the invention.

The control device I for the matrix converter 1 includes the matrix converter 1, a main circuit 2, an input filter 5, a snubber circuit 6, a load 7, an input voltage detector 8, an output current detector 9, a pulse width modulator 10, a pulse-width-modulation (PWM) generation circuit 11, and an input voltage command calculator 12. The input filter 5 includes reactors 3 and capacitors 4, and the capacitors 4 are included in the matrix converter 1.

The matrix converter 1 is supplied with three-phase power from a three-phase power supply 40 through the reactors 3. The load 7 is connected with the output side of the matrix converter 1. For example, the load 7 may be an alternating-current (AC) motor.

The main circuit 2 includes a plurality of bi-directional semiconductor switching elements. The main circuit 2 is driven with a gate signal from the PWM generation circuit 11 (described later), and performs bi-directional power conversion.

The input filter 5 is provided between the three-phase power supply 40 and the input side of the matrix converter 1.

The reactors 3 include an inside reactance of the three-phase power supply 40 or the three-phase power supply 40, and a plurality of reactors provided on lines between the three-phase power supply 40 and the matrix converter 1.

The snubber circuit 6 absorbs a surge voltage that is generated by switching of the main circuit 2.

The input voltage detector 8 detects an input voltage $V_{in}$ of the matrix converter 1.

The output current detector 9 detects an output current $I_{out}$ for each phase from the matrix converter 1.

The pulse width modulator 10 receives the output current $I_{out}$ from the output current detector 9, the input voltage $V_{in}$ from the input voltage detector 8, and an input voltage command $V_s$ from the input voltage command calculator 12; selects input phases corresponding to the aforementioned intermediate potential phase and reference potential phase; and generates a PWM pulse command by processing as described below.

Next, the processing for generating a pulse width of the PWM pulse command by the pulse width modulator 10 will be described.

The input voltage $V_{in}$ and the input voltage command $V_s$ are, in more strict sense, vectors having phases and amplitudes.

When the input voltage command vector $V_s$ is a sine-wave signal having a phase and an amplitude equivalent to a fundamental wave of the input supply voltage, and the input voltage $V_{in}$ matches the input voltage command vector $V_s$, a terminal voltage of the capacitors 4 is also a sine wave. Thus, an error voltage vector $\Delta V_c$ between the input voltage command vector $V_s$ and the input voltage $V_{in}$ is controlled to be minimized, and the pulse width of the PWM pulse command is determined.

However, when the control device for the matrix converter, which selectively uses the minimum potential phase and the maximum potential phase as the input phase defining the pair together with the intermediate potential phase, is used, an output current is distributed between a reference potential phase and the intermediate potential phase, and between the minimum potential phase and the maximum potential phase of the input, and the output current flows to the output side of the input filter 5. This current may charge and discharge the capacitors 4, and hence a voltage is generated. Therefore, when the pulse width of the PWM pulse is determined, the voltage has to be taken into consideration.

Assuming that the current flowing at the output side of the input filter 5 is a filter output current vector $I_L$, and a voltage vector of the capacitors 4 generated upon charge and discharge with $I_L$ is a charge/discharge voltage vector $V_L$, if the filter output current vector $I_L$ is approximated as a constant value, the charge/discharge voltage vector $V_L$ is obtained by Expression (1) as follows:

$$V_L = (1/C) \int I_L dt = (t/C) I_L = k \cdot I_L (k=t/C) \quad (1).$$

The distribution of the output current to the input phase is determined by the output state resulted from switching of the semiconductor switching elements in the matrix converter 1. Assuming that the input voltage $V_{in}$ is $V_{in0}$ at the start of the output state while the output state is not changed, Expression (1) indicates that the input voltage $V_{in}$ is changed from $V_{in0}$ to $V_{in0}+V_L$ when a time t elapses. The error voltage vector $\Delta V_c$ is controlled to match the charge/discharge voltage $V_L$ calculated by Expression (1), so that the input voltage $V_{in}$ approaches the input voltage command $V_s$ while the output state is not changed. In this way, the waveform of the input voltage $V_{in}$, i.e., the terminal voltage of the capacitors 4 is shaped into a substantially sinusoidal signal equivalent to the input voltage command $V_s$.

The pulse width modulator 10 generates the PWM pulse command to have pulse widths $T_1$ and $T_2$ that satisfy the above condition.

The procedure of generating the PWM pulse by the pulse width modulator 10 will be described below.

First, a deviation Hmid between an error voltage $\Delta V_c$ and a charge/discharge voltage $V_L$ with the pulse width $T_1$, and a deviation Hmax between an error voltage $\Delta V_c$ and a charge/discharge voltage $V_L$ with the pulse width $T_2$ are calculated.

The error voltage $\Delta V_c$ is obtained by subtracting the input voltage $V_{in}$ from the input voltage command $V_s$. The deviations Hmid and Hmax of the charge/discharge voltage $V_L$ are defined and derived by Expressions (2) to (5) as follows:

$$Hmid = |\Delta V_c - k_1 \cdot Imid| = |V_s - V_{in} - k_1 \cdot Imid| \quad (2),$$

and $$Hmax = |\Delta V_c - k_2 \cdot Imax| = |V_s - V_{in} - k_2 \cdot max| \quad (3),$$

then, $$k_1 = 2 \cdot T_1/C \quad (4), \text{ and}$$

$$k_2 = 2 \cdot T_2/C \quad (5),$$

where Imid is an output current $I_{out}$ with the pulse width $T_1$, and Imax is an output current $I_{out}$ with the pulse width $T_2$.

The output state $OUT_1$ of smaller one of the deviations Hmid and Hmax causes a smaller difference between $\Delta V_c$ and $V_L$ as compared with that in the output state $OUT_2$ of greater one. Continuing the output state $OUT_1$ rather than the output state $OUT_2$ is more advantageous to that the input voltage $V_{in}$ approaches the input voltage command $V_s$. Thus, the pulse widths $T_1$ and $T_2$ are determined so that the output state of smaller one of the deviations Hmax and Hmid is continued.

To attain this, a ratio of $T_1$ to $T_2$ may be equivalent to a ratio of Hmax to Hmid by Expression (6) as follows:

$$T_1 : T_2 = Hmax : Hmid \quad (6).$$

To determine more specific values of $T_1$ and $T_2$, Conditional expression (7), in which the area S of the PWM pulse command is equivalent to a product of an output line voltage command $V_{ref}$ and a pulse period T, is applied as follows:

$$S = T_1' + T_2', \text{ and}$$

$$2(T_1 \cdot \Delta Emid + T_2 \cdot \Delta Emax) = T \cdot V_{ref} \quad (7).$$

where $\Delta Emax$ is a potential difference between the maximum potential phase and the minimum potential phase, and $\Delta Emid$ is a potential difference between the intermediate potential phase and the reference potential phase.

As described above, the pulse width modulator 10 determines the pulse widths $T_1$ and $T_2$ of the PWM pulse command by Expressions (2) to (7) to generate the PWM pulse command.

The PWM generation circuit 11 uses the PWM pulse command calculated by the pulse width modulator 10 to generate a gate signal to the main circuit 2, and to perform commutation sequence processing in accordance with the polarity of the input voltage $V_{in}$.

The input voltage command calculator 12 inputs the input voltage $V_{in}$ detected by the input voltage detector 8 to a phase-locked loop (PLL) provided inside the input voltage command calculator 12. The PLL outputs a sine wave whose phase is synchronized with the phase of the input voltage $V_{in}$.

At this time, no response is made to a rapid change in voltage of the input voltage $V_{in}$ until the phase of the sine wave is synchronized with the phase of the input voltage $V_{in}$. The PLL shapes the waveform of the input voltage $V_{in}$, and outputs a sine wave having a phase and an amplitude equivalent to the fundamental wave of the input voltage $V_{in}$.

In the above description, modulation correction for a single line voltage command has been described. In the case of a three-phase load, the minimum potential phase, the intermediate potential phase, and the maximum potential phase of the input are not changed within a single carrier period. If two line voltage commands satisfy Expressions (1) to (7), $T_1$ and $T_2$ capable of continuing the output state that efficiently causes $V_c$ to match $V_s$ can be determined, and the capacitor voltage $V_c$ can match the input voltage command $V_s$.

Under the condition that the area S of the PWM pulse command is constant, the input voltage $V_{in}$, that is, a terminal voltage of the capacitors 4 matches the input voltage command $V_s$. Accordingly, the oscillation of the terminal voltage of the input capacitors can be reduced.

In the first embodiment, the reactance that forms the input filter 5 has used the inside reactance in the three-phase power supply 40 or a transformer (not shown) at the input side of the matrix converter 1.

Figure 2:
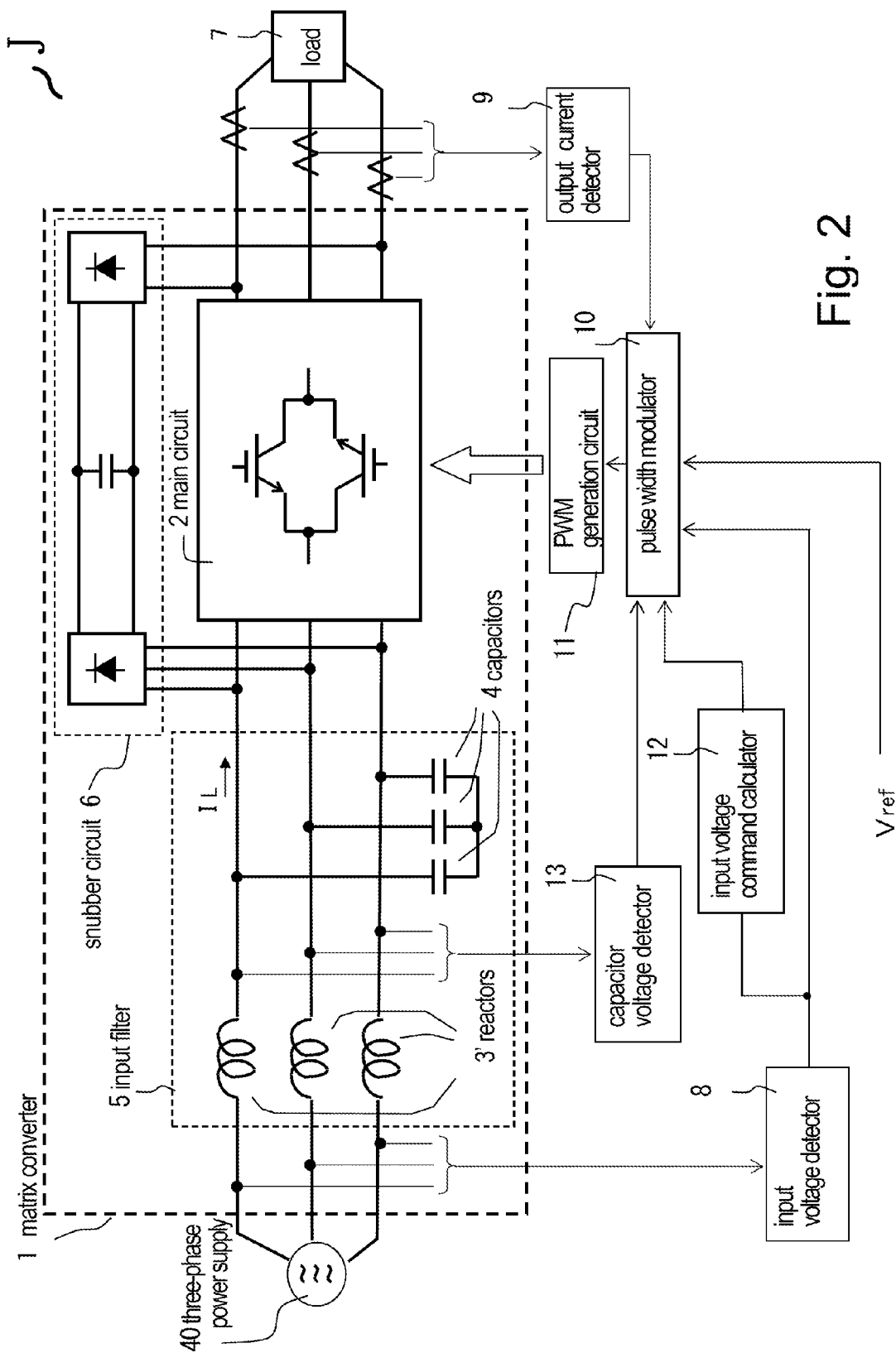
FIG. 2 is a block diagram showing a configuration of a control device for a matrix converter according to a modification of the first embodiment.

FIG. 2 is a block diagram showing a control device J for a matrix converter provided with a reactance that forms a filter at the input side, by providing a reactance in the matrix converter.

The control device J for the matrix converter includes capacitor voltage detector 13 in addition to the input voltage detector 8.

The capacitor voltage detector 13 detects a capacitor voltage $V_c$.

The pulse width modulator 10 uses the error voltage vector $\Delta V_c$ as a difference voltage between the input voltage command $V_s$ and the capacitor voltage $V_c$, and uses the input voltage $V_{in}$ as a voltage detected by the input voltage detector 8, to determine the pulse widths $T_1$ and $T_2$ of the PWM pulse command.

In this way, the embodiment can be implemented even when the embodiment is modified like the control device J for the matrix converter. In particular, the first embodiment and any of other embodiments described later can be implemented when the matrix converter 1 includes reactors 3', and the reactors 3' forms the input filter 5. Further, a supplement of a reactance may be separately arranged.

Second Embodiment

Figure 3:
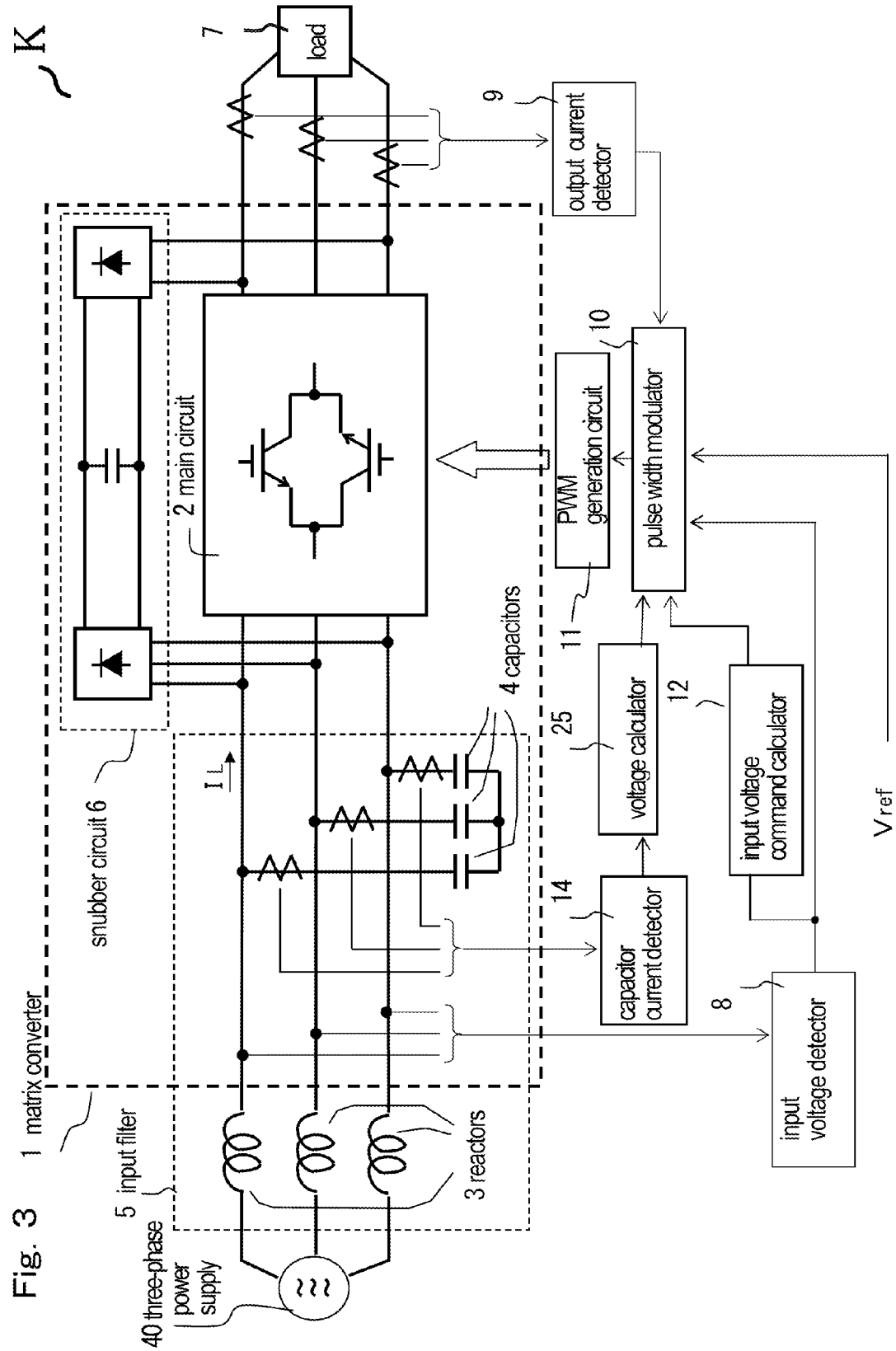
FIG. 3 is a block diagram showing a configuration of a control device for a matrix converter according to a second embodiment.

FIG. 3 is a block diagram showing a control device K for a matrix converter according to a second embodiment The configuration in FIG. 3 is different from the configuration in FIG. 1 in that the control device I for the matrix converter includes the input voltage detector 8, whereas the control device K for the matrix converter includes a capacitor current detector 14 and detects a capacitor current vector $I_c$ instead of directly detecting the input voltage $V_{in}$. A voltage calculator 25 obtains a capacitor voltage vector $V_c$ by using $I_c$. The other configuration of the control device K is similar to that of the control device I, and hence the same reference signs are used.

The voltage calculator 25 uses the capacitor current $I_c$ detected by the capacitor current detector 14, to calculate the capacitor voltage vector $V_c$ by Expression (8) as follows:

$$V_c = (1/C)\int I_c dt \tag{8}$$

Since the capacitor voltage vector $V_c$ is calculated, the embodiment can be implemented similarly to the first embodiment.

Third Embodiment

Figure 4:
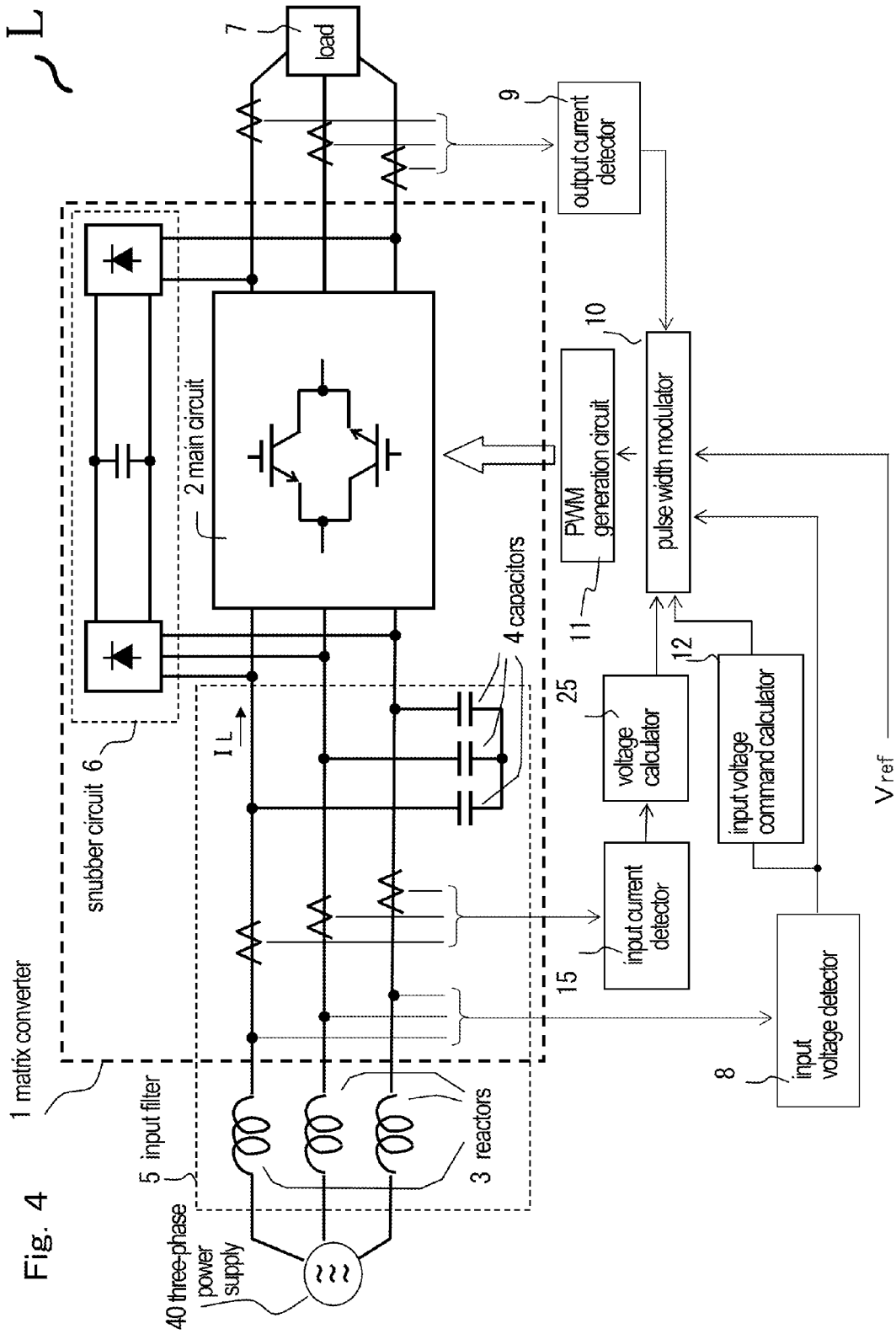
FIG. 4 is a block diagram showing a configuration of a control device for a matrix converter according to a third embodiment.

FIG. 4 is a block diagram showing a control device L for a matrix converter according to a third embodiment.

The configuration in FIG. 4 is different from the configuration in FIG. 1 in that the control device I for the matrix converter includes the input voltage detector 8, whereas the control device L for the matrix converter includes an input current detector 15 and detects an input current $I_{in}$ to the matrix converter 1 instead of directly detecting the input voltage $V_{in}$. The voltage calculator 25 obtains the capacitor voltage vector $V_c$ by using $I_{in}$. The other configuration of the control device L is similar to that of the control device I, and hence the same reference signs are used.

The voltage calculator 25 uses the input current $I_{in}$ to the matrix converter 1 detected by the input current detector 15, to calculate the capacitor voltage vector $V_c$ by Expression (9) as follows, Expression (9) taking into account the current vector $I_L$ whose output current $I_{out}$ is distributed to the input side:

$$V_c = (1/C)\int (I_{in} - I_L) dt \tag{9}$$

Since the capacitor voltage vector $V_c$ is calculated, the embodiment can be implemented similarly to the first embodiment.

Fourth Embodiment

Figure 5:
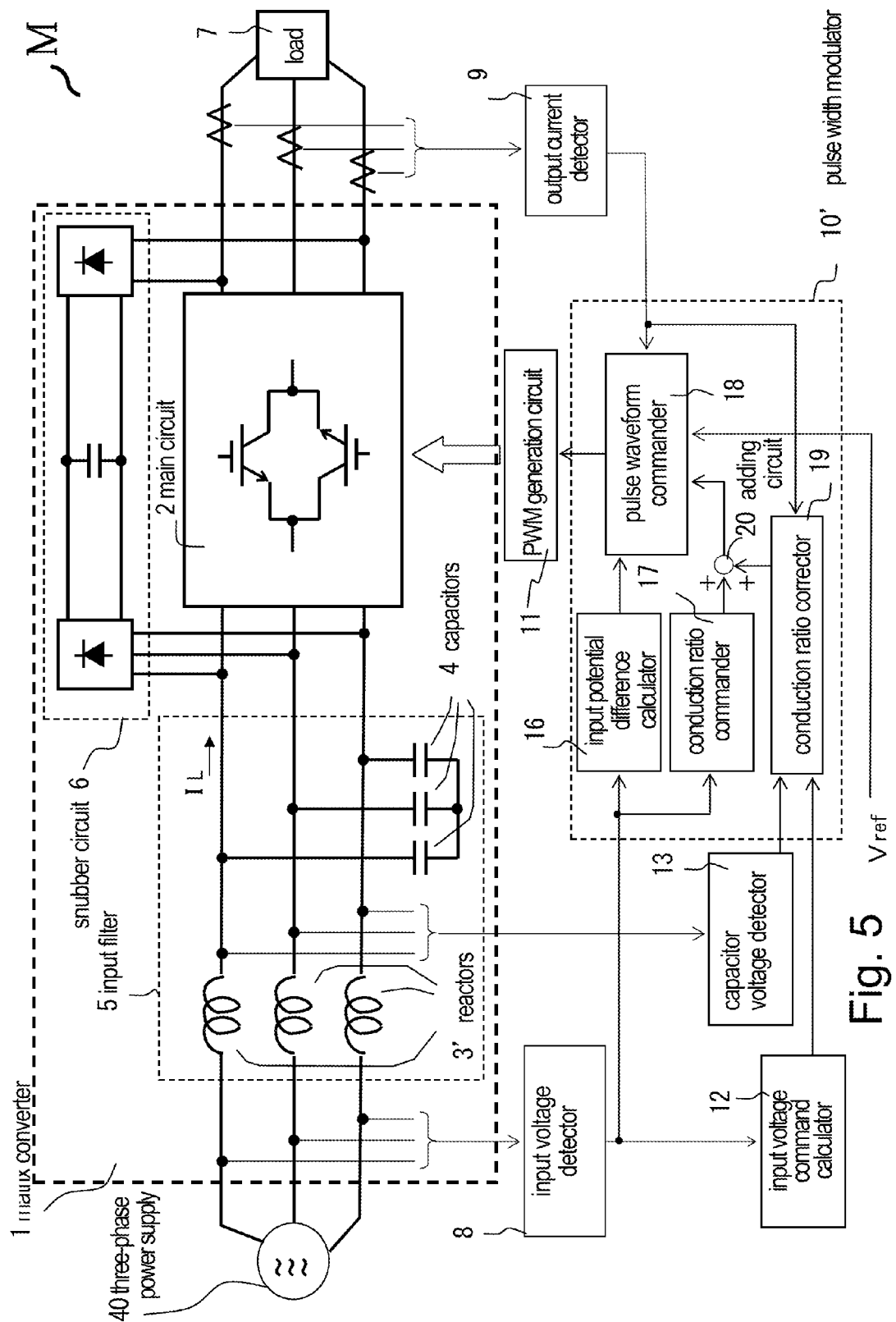
FIG. 5 is a block diagram showing a configuration of a control device for a matrix converter according to a fourth embodiment.

FIG. 5 is a block diagram showing a control device M for a matrix converter according to a fourth embodiment.

The fourth embodiment is applied to a matrix converter that controls the value of an output voltage and the form of an input current by varying conduction ratio $\alpha$ that are ratios of the area S of the pulse to the pulse width $T_1$ and to the pulse width $T_2$. In particular, the embodiment is applied to a matrix converter that determines the conduction ratio $\alpha$ described above and causes the waveform of the input current to approach a sign wave.

The configuration in FIG. 5 is different from the configuration in FIG. 2 in that the control device M for the matrix converter includes an input potential difference calculator 16, a conduction ratio commander 17, a pulse waveform commander 18, a conduction ratio corrector 19, and an adding circuit 20, instead of the pulse width modulator 10.

The input potential difference calculator 16 judges the values of three phases of an input voltage on the basis of the input voltage detected by the input voltage detector 8, and determines input phases corresponding to the maximum potential phase, the intermediate potential phase, and the minimum potential phase.

The conduction ratio commander 17, similarly to the input potential difference calculator 16, determines the input phases corresponding to the maximum potential phase, the intermediate potential phase, and the minimum potential phase. The conduction ratio commander 17 determines the conduction ratio $\alpha$ as a value equivalent to a ratio of a voltage $V_{mid}$ of the intermediate potential phase to a voltage $V_{ex}$ of a phase other than the intermediate potential phase and the reference potential phase by Expression (10) as follows:

$$\alpha = T_1/T_2 = V_{mid}/V_{ex} \tag{10}$$

The pulse waveform commander 18 outputs the input phases corresponding to the intermediate potential phase and the reference potential phase determined on the basis of the output line voltage command $V_{ref}$ to the load 7, the input voltage $V_{in}$, and the output current $I_{out}$, and also outputs the conduction ratio $\alpha$, as the PWM pulse command, to the PWM generation circuit 11.

Similarly to the first embodiment, the conduction ratio corrector 19 calculates the deviations Hmid and Hmax by Expressions (2) and (3), and then obtains a correction value $\Delta\alpha$ for the conduction ratio $\alpha$ by Expression (11) as follows:

$$\Delta\alpha = K(Hmax - Hmid) \tag{11}$$

where K is a proportional constant.

The adding circuit 20 adds the correction value $\Delta\alpha$ for the conduction ratio $\alpha$ to the conduction ratio $\alpha$ calculated by the conduction ratio commander 17.

With the above processing, the conduction ratio $\alpha$ is corrected to be decreased if Hmax is greater than Hmid and the effect of matching $V_c$ with $V_s$ in the state with $T_2$ is greater than that in the state with $T_1$. Thus, the pulse width $T_2$ can be increased (whereas the pulse width $T_1$ can be decreased). In contrast, the conduction ratio $\alpha$ is corrected to be increased if Hmax is greater than Hmid and the effect of matching $V_c$ with $V_s$ in the state with $T_1$ is greater than that in the state with $T_2$. Thus, the pulse width $T_1$ can be increased (whereas the pulse width $T_2$ can be decreased).

As described above, the conduction ratio corrector 19 and the adding circuit 20 perform modulation correction by changing the conduction ratio $\alpha$ into $\alpha + \Delta\alpha$ such that the capacitor voltage $V_c$ matches the input voltage command $V_s$.

In the above description, modulation correction for a single line voltage command has been described. In the case of a three-phase load, by simultaneously performing the calculations by Expressions (2), (3), (10), and (11) for two line voltage commands, addition values $\Delta\alpha$ for conduction ratio $\alpha$ can be individually calculated for the respective line voltage commands. By adding $\Delta\alpha$ obtained by the individual calculation to the common conduction ratio $\alpha$, similarly to the first embodiment, the capacitor voltage $V_c$ can match the input voltage command $V_s$. The oscillation of the input voltage $V_{in}$ can be reduced.

As described in the second embodiment, the capacitor voltage detector 13 in FIG. 5 may be replaced with the capacitor current detector 14 and the voltage calculator 25.

Alternatively, as described in the third embodiment, the capacitor voltage detector 13 in FIG. 5 may be replaced with the input current detector 15 and the voltage calculator 25.

In the above description, the number of output phases is three, however, the number of output phases is not limited thereto. Regardless of the number of the output phases, a number of line voltage commands smaller by one than the number of output phases may be given as output voltage commands, and the embodiment may be implemented for each of the line voltage commands. Accordingly, the capacitor voltage $V_c$ can match the input voltage command $V_s$.

The embodiment may be applied to a wide range of matrix converters from single-phase output to multi-phase output.

Fifth Embodiment

Figure 6:
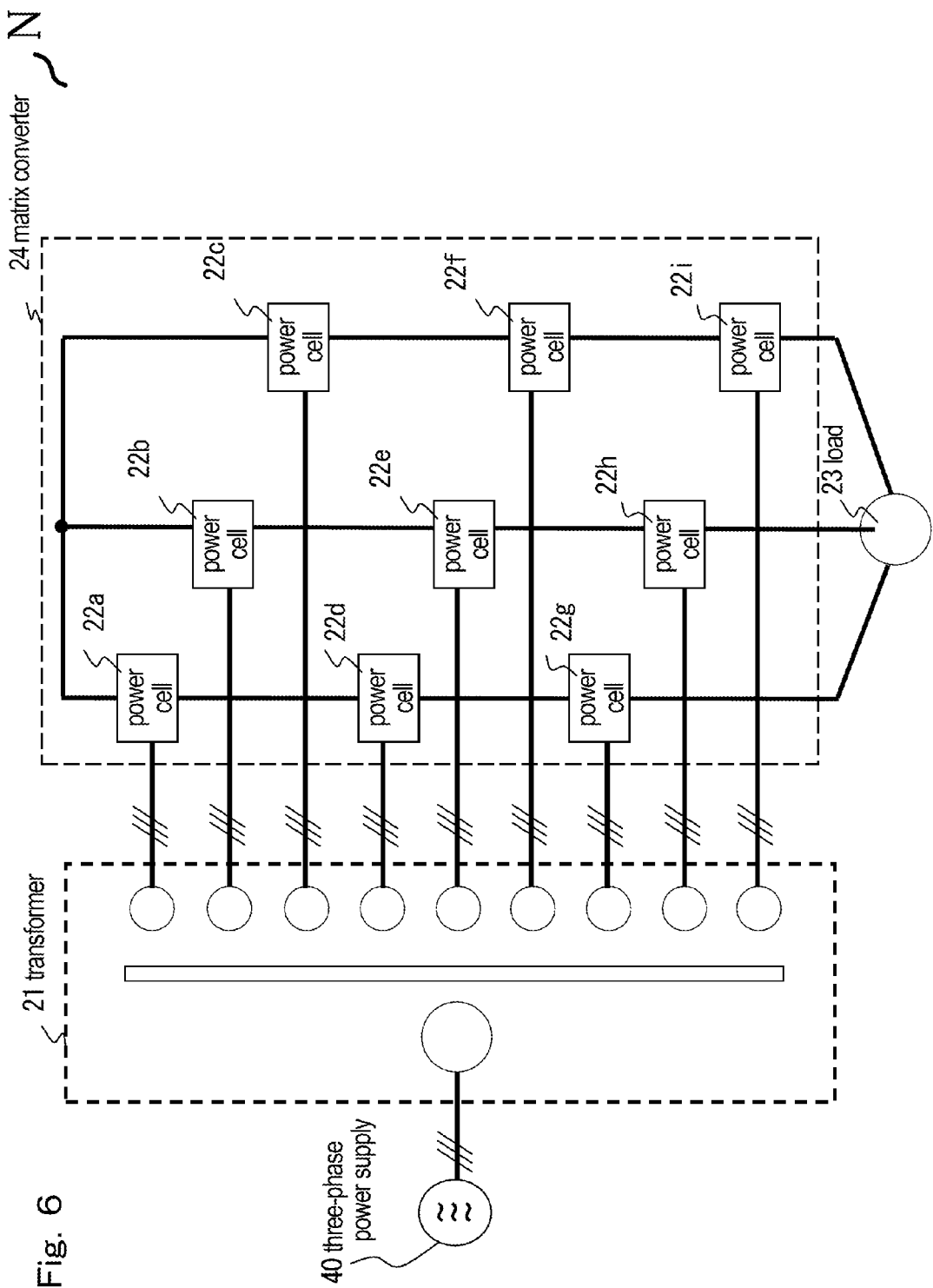
FIG. 6 is a block diagram showing a configuration of a control device for a matrix converter according to a fifth embodiment.

FIG. 6 is a block diagram showing a control device N for a matrix converter according to a fifth embodiment.

The fifth embodiment is applied to a series-connected multi-phase matrix converter having outputs of a single-phase AC or a DC, the outputs being connected with one another in series.

Referring to FIG. 6, a transformer 21 receives, as an input, three-phase AC power from the three-phase power supply 40, and converts the power into an input voltage of the matrix converter. Power cells 22a to 22i each receive, as an input, a secondary voltage of the transformer 21 and output a single-phase alternating voltage. A load 23 is connected with a matrix converter 24 in which the multiple power cells 22a to 22i are connected with one another in series.

The power cells 22a to 22i that form the matrix converter 24 are connected in series, and generate a single-phase voltage of output multi-phase AC. Also, since the power cells 22a to 22i employ the matrix converter 1 described in any of the first to fourth embodiments, in the matrix converter 24 with the series-connected multi-phase configuration, voltage oscillation of capacitors for input filters included in the power cells 22a to 22i can be reduced.

Sixth Embodiment

Figure 7:
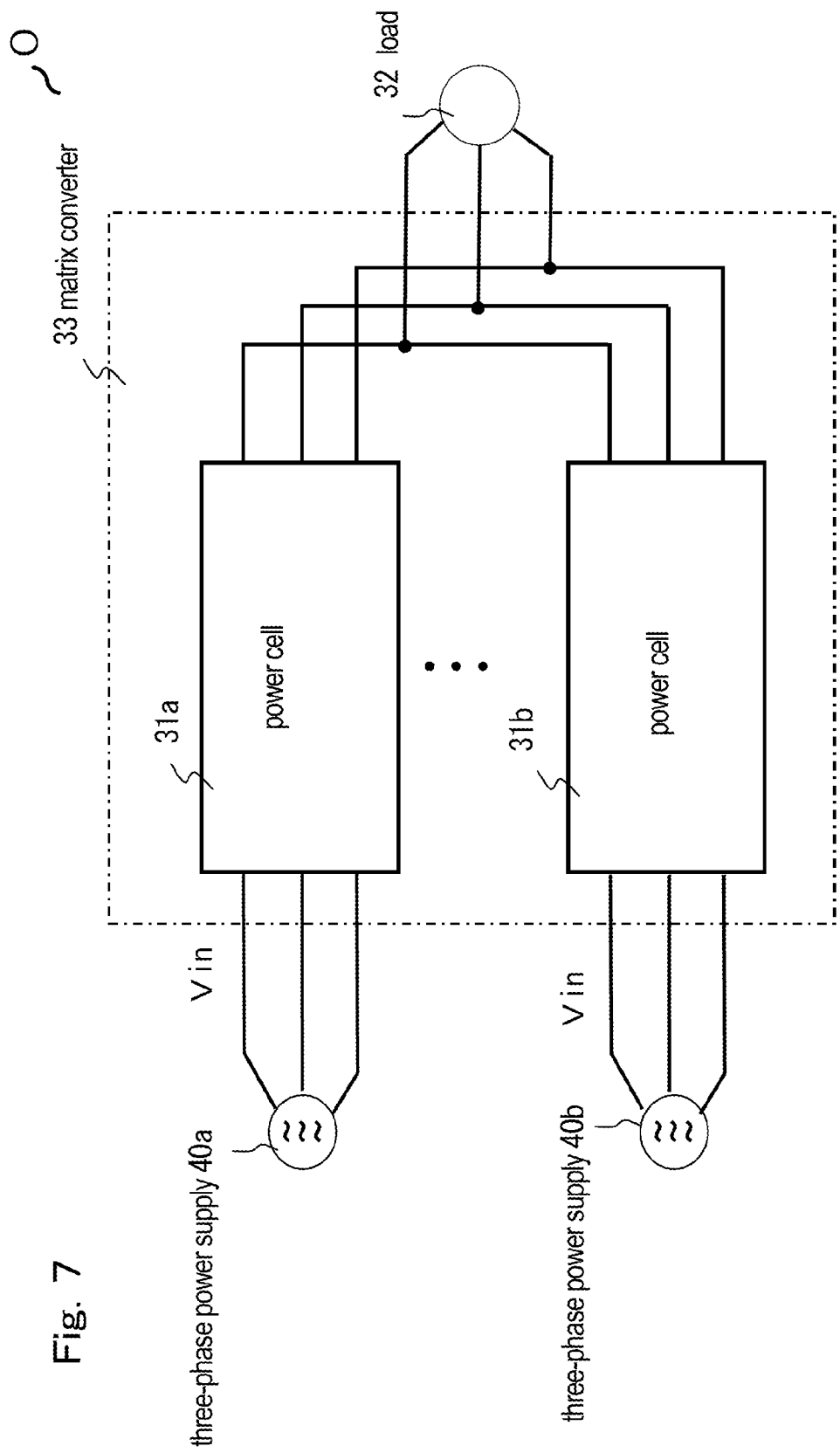
FIG. 7 is a block diagram showing a configuration of a control device for a matrix converter according to a sixth embodiment.

FIG. 7 is a block diagram showing a control device O for a matrix converter according to a sixth embodiment.

The sixth embodiment is applied to a parallel-connected multi-phase matrix converter having outputs of a single-phase AC or a DC, the outputs being connected with one another in parallel.

Referring to FIG. 7, power cells 31a and 31b receive, as an input, three-phase AC power from three-phase power supplies 40a and 40b, and outputs an alternating voltage. A load 32 is connected with a matrix converter 33 in which the power cells 31a and 31b are connected with one another in parallel.

Also, since the power cells 31a and 31b employ the matrix converter 1 described in any of the first to fourth embodiments, in the matrix converter 33 with the parallel-connected multi-phase configuration, voltage oscillation of capacitors for an input filter included in the power cells 31a and 31b can be reduced.

Seventh Embodiment

Next, an output voltage generating method according to a seventh embodiment will be described.

The seventh embodiment is applied to, for example, the control device I for the matrix converter according to the first embodiment.

In step S001, an input voltage of the three-phase power supply 40 is detected.

In step S002, a terminal voltage of the capacitors 4 is detected.

In step S003, an input voltage command having a phase and an amplitude equivalent to a fundamental wave of the input voltage detected in step S001 is calculated.

In step S004, assuming that a minimum potential phase or a maximum potential phase of the input voltage serves as a reference potential phase, a first potential difference between the reference potential phase and the intermediate potential phase, and a second potential difference between the minimum potential phase and the maximum potential phase are calculated.

In step S005, assuming that the first and second potential differences calculated in step S004 are pulse heights, a pulse width of a pulse having a pulse height equivalent to the first potential difference, and a pulse width of a pulse having a pulse height equivalent to the second potential difference are determined such that the detected terminal voltage of the capacitors 4 matches the input voltage command in terms of the value and the direction.

In step S006, a PWM pulse command signal is generated from the two pulse widths determined in step S005.

The specific processing in each step has been described in the first embodiment. Hence, the redundant description thereof is omitted here.

The PWM pulse command signal is generated as described above. Thus, the output voltage from the control device for the PWM pulse command signal is generated.

Eighth Embodiment

Next, an output voltage generating method according to an eighth embodiment will be described.

The seventh embodiment is applied to, for example, the control device K for the matrix converter according to the second embodiment. In step S001 of the seventh embodiment, a terminal current of the capacitors 4 is detected. Also, similar to the second embodiment, the terminal voltage of the capacitors 4 is calculated as described in the second embodiment, while the other steps are similar to the aforementioned steps. Thus, the output voltage can be generated.

Similarly, the embodiment can be implemented even if the embodiment is applied to the control device for the matrix converter according to the third embodiment.

Ninth Embodiment

Next, an output voltage correcting method for a control device for a matrix converter will be described according to a ninth embodiment.

For example, the embodiment is applied to the control device M for the matrix converter according to the fourth embodiment.

In step S001, an input voltage of the three-phase power supply 40 is detected.

In step S002, a terminal voltage of the capacitors 4 is detected.

In step S003, an input voltage command having a phase and an amplitude equivalent to a fundamental wave of the input voltage detected in step S001 is calculated.

In step S004, assuming that a minimum potential phase or a maximum potential phase of the input voltage serves as a reference potential phase, a first potential difference between the reference potential phase and an intermediate potential phase, and a second potential difference between the minimum potential phase and the maximum potential phase are calculated.

In step S005, assuming that the first and second potential differences calculated in step S004 are pulse heights, a ratio of a pulse width of a pulse having a pulse height equivalent to the first potential difference, to a pulse width of a pulse having a pulse height equivalent to the second potential difference is determined in accordance with a phase of the calculated input voltage command.

In step S006, a PWM pulse command signal is generated by using the two pulse widths calculated in step S004 and the ratio of the pulse widths determined in step S005.

In step S007, a ratio of the pulse widths determined in step S005 is corrected such that the value and direction of the detected terminal voltage of the capacitors matches the input voltage command.

The specific processing in each step has been described in the fourth embodiment. Hence, the redundant description thereof is omitted here.

The PWM pulse command signal is generated as described above. Thus, the output voltage from the control device for the PWM pulse command signal is generated.

The method according to any of the seventh to ninth embodiments can be employed regardless of the number of phases of the output, and can be applied to a single-phase AC or a DC output matrix converter.

Further, the method according to any of the seventh to ninth embodiments may be applied to the matrix converter with the series or parallel connection arrangement according to any of the fifth and sixth embodiments.

As described above, with any of the embodiments, the oscillation in the terminal voltage of the capacitor for the input filter in the matrix converter can be reduced. The matrix converter may be applied to a single-phase output matrix converter, a multi-phase output matrix converter with the series or parallel connection arrangement, or power cells in a multi-phase output matrix converter in which the power cells are connected with one another in series or in parallel. Accordingly, the breakdown voltage of the capacitor for the input filter and the breakdown voltage of the snubber circuit in the main circuit can be decreased, resulting in that the cost of the matrix converter can be decreased, and an influence to other devices due to the oscillation can be reduced.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A control device for a matrix converter, comprising:
   an input voltage detector configured to detect an input voltage of the matrix converter;
   an output current detector configured to detect an output current of the matrix converter;
   a pulse width modulator configured to generate a pulse-width-modulation pulse command signal by using the input voltage, the output current, and an output line voltage command; and
   an input voltage command calculator configured to calculate an input voltage command of the matrix converter,
   wherein the input voltage command calculator is configured to output, based on the input voltage detected by the input voltage detector, a signal whose waveform is shaped into a sine wave having a phase and an amplitude that are equivalent to a phase and an amplitude of a fundamental wave of the input voltage, and
   wherein the pulse width modulator is configured to generate the pulse-width-modulation pulse command signal by using the input voltage, the output current, the signal whose waveform is shaped into the sine wave, and the output line voltage command, and to output the pulse-width-modulation pulse command signal such that the input voltage matches the signal whose waveform is shaped into the sine wave, the pulse width modulator being configured to determine a pulse width of the pulse-width-modulation pulse command signal based on an error between the input voltage detected by the input voltage detector and the signal whose waveform is shaped into the sine wave.

2. The control device for the matrix converter according to claim 1, further comprising:
   a filter provided at an input side of the matrix converter and comprising a reactor and a capacitor; and
   a capacitor voltage detector configured to detect a terminal voltage of the capacitor,
   wherein the pulse width modulator outputs the pulse-width-modulation pulse command signal such that the terminal voltage matches the signal whose waveform is shaped into the sine wave.

3. The control device for the matrix converter according to claim 2,
   wherein the pulse width modulator comprises
      an input potential difference calculator configured to calculate, using a minimum potential phase or a maximum potential phase of the input voltage serving as a reference potential phase, a first potential difference between the reference potential phase and an intermediate potential phase, and a second potential difference between the minimum potential phase and the maximum potential phase;
      a conduction ratio commander configured to output, using the first and second potential differences serving as pulse heights, a ratio of a pulse width of a pulse having a pulse height equivalent to the first potential difference to a pulse width of a pulse having a pulse height equivalent to the second potential difference, the ratio being output as a conduction ratio in accordance with a phase of the input voltage;
a conduction ratio corrector configured to correct the conduction ratio; and
a pulse waveform commander configured to generate the pulse-width-modulation pulse command signal by using the first and second potential differences and the corrected conduction ratio.

4. The control device for the matrix converter according to claim 3, wherein for the pulse width determined by the potential difference between the minimum potential phase and the intermediate potential phase and for the pulse width determined by the potential difference between the minimum potential phase and the maximum potential phase, the conduction ratio corrector is configured to provide a correction value for the conduction ratio by using a difference between an error voltage vector and a capacitor voltage vector, the error voltage vector being obtained between a sine-wave signal having a phase and an amplitude equivalent to a fundamental wave of an input voltage, the capacitor voltage vector being generated by charging and discharging a current flowing to an output side of the filter.

5. The control device for the matrix converter according to claim 2, wherein the matrix converter is configured to receive an alternating current as an input and to output a single-phase alternating current or a direct current.

6. The control device for the matrix converter according to claim 5, wherein the matrix converter comprises multiple power cells connected in series.

7. The control device for the matrix converter according to claim 2, wherein the matrix converter comprises multiple power cells connected in parallel.

8. The control device for the matrix converter according to claim 1, further comprising:
one of a capacitor provided at an input side of the matrix converter and defining a filter together with an inside reactance of a power supply, and a filter provided at an input side of the matrix converter and comprising a reactor and a capacitor; and
an input current detector configured to detect an input current of the matrix converter,
wherein the pulse width modulator is configured to output the pulse-width-modulation pulse command signal such that the input voltage of the matrix converter obtained by using the input current matches the signal whose waveform is shaped into the sine wave.

9. The control device for the matrix converter according to claim 8,
wherein the pulse width modulator comprises
an input potential difference calculator configured to calculate, using a minimum potential phase or a maximum potential phase of the input voltage serving as a reference potential phase, a first potential difference between the reference potential phase and an intermediate potential phase, and a second potential difference between the minimum potential phase and the maximum potential phase;
a conduction ratio commander configured to output, using the first and second potential differences serving as pulse heights, a ratio of a pulse width of a pulse having a pulse height equivalent to the first potential difference to a pulse width of a pulse having a pulse height equivalent to the second potential difference, the ratio being output as a conduction ratio in accordance with a phase of the input voltage;
a conduction ratio corrector configured to correct the conduction ratio; and
a pulse waveform commander configured to generate the pulse-width-modulation pulse command signal by using the first and second potential differences and the corrected conduction ratio.

10. The control device for the matrix converter according to claim 9, wherein for the pulse width determined by the potential difference between the minimum potential phase and the intermediate potential phase and for the pulse width determined by the potential difference between the minimum potential phase and the maximum potential phase, the conduction ratio corrector is configured to provide a correction value for the conduction ratio by using a difference between an error voltage vector and a capacitor voltage vector, the error voltage vector being obtained between a sine-wave signal having a phase and an amplitude equivalent to a fundamental wave of an input voltage, the capacitor voltage vector being generated by charging and discharging a current flowing to an output side of the filter.

11. The control device for the matrix converter according to claim 8, wherein the matrix converter is configured to receive an alternating current as an input and to output a single-phase alternating current or a direct current.

12. The control device for the matrix converter according to claim 11, wherein the matrix converter comprises multiple power cells connected in series.

13. The control device for the matrix converter according to claim 8, wherein the matrix converter comprises multiple power cells connected in parallel.

14. The control device for the matrix converter according to claim 1,
wherein the pulse width modulator comprises
an input potential difference calculator configured to calculate, using a minimum potential phase or a maximum potential phase of the input voltage serving as a reference potential phase, a first potential difference between the reference potential phase and an intermediate potential phase, and to calculate a second potential difference between the minimum potential phase and the maximum potential phase,
a conduction ratio commander configured to output, using the first and second potential differences serving as pulse heights, a ratio of a pulse width of a pulse having a pulse height equivalent to the first potential difference to a pulse width of a pulse having a pulse height equivalent to the second potential difference, the ratio being output as a conduction ratio in accordance with a phase of the input voltage,
a conduction ratio corrector configured to correct the conduction ratio, and
a pulse waveform commander configured to generate the pulse-width-modulation pulse command signal by using the first and second potential differences and the corrected conduction ratio.

15. The control device for the matrix converter according to claim 14, wherein for the pulse width determined by the potential difference between the minimum potential phase and the intermediate potential phase and for the pulse width determined by the potential difference between the minimum potential phase and the maximum potential phase, the conduction ratio corrector is configured to provide a correction value for the conduction ratio by using a difference between an error voltage vector and a capacitor voltage vector, the error voltage vector being obtained between a sine-wave signal having a phase and an amplitude equivalent to a fundamental wave of an input voltage, the capacitor voltage vector being generated by charging and discharging a current flowing to an output side of the filter.

16. The control device for the matrix converter according to claim 1, wherein the matrix converter is configured to receive an alternating current as an input and to output a single-phase alternating current or a direct current.

17. The control device for the matrix converter according to claim 16, wherein the matrix converter comprises multiple power cells connected in series.

18. The control device for the matrix converter according to claim 1, wherein the matrix converter comprises multiple power cells connected in parallel.

19. The control device for the matrix converter according to claim 1, wherein the pulse width modulator is configured to determine the pulse width by controlling the error to be minimized.

20. A control device for a matrix converter comprising:
an input voltage detector configured to detect an input voltage of the matrix converter;
an output current detector configured to detect an output current of the matrix converter;
a pulse width modulator configured to generate a pulse-width-modulation pulse command signal by using the input voltage, the output current, and an output line voltage command; and
an input voltage command calculator configured to calculate an input voltage command of the matrix converter;
one of a first capacitor provided at an input side of the matrix converter and defining a first filter together with an inside reactance of a power supply, and a second filter provided at an input side of the matrix converter and comprising a reactor and a second capacitor; and
a capacitor current detector configured to detect a current flowing through one of the first and second capacitors,
wherein the input voltage command calculator is configured to output a signal whose waveform is shaped into a sine wave having a phase and an amplitude that are equivalent to a phase and an amplitude of a fundamental wave of the input voltage,
wherein the pulse width modulator is configured to generate the pulse-width-modulation pulse command signal by using the input voltage, the output current, the signal whose waveform is shaped into the sine wave, and the output line voltage command, and to output the pulse-width-modulation pulse command signal such that the input voltage matches the signal whose waveform is shaped into the sine wave, and
wherein the pulse width modulator is configured to output the pulse-width-modulation pulse command signal such that a terminal voltage of one of the first and second capacitors obtained by using the current flowing through one of the first and second capacitors matches the signal whose waveform is shaped into the sine wave.

21. The control device for the matrix converter according to claim 20,
wherein the pulse width modulator comprises
an input potential difference calculator configured to calculate, using a minimum potential phase or a maximum potential phase of the input voltage serving as a reference potential phase, a first potential difference between the reference potential phase and an intermediate potential phase, and a second potential difference between the minimum potential phase and the maximum potential phase;
a conduction ratio commander configured to output, using the first and second potential differences serving as pulse heights, a ratio of a pulse width of a pulse having a pulse height equivalent to the first potential difference to a pulse width of a pulse having a pulse height equivalent to the second potential difference, the ratio being output as a conduction ratio in accordance with a phase of the input voltage;
a conduction ratio corrector configured to correct the conduction ratio; and
a pulse waveform commander configured to generate the pulse-width-modulation pulse command signal by using the first and second potential differences and the corrected conduction ratio.

22. The control device for the matrix converter according to claim 21, wherein for the pulse width determined by the potential difference between the minimum potential phase and the intermediate potential phase and for the pulse width determined by the potential difference between the minimum potential phase and the maximum potential phase, the conduction ratio corrector is configured to provide a correction value for the conduction ratio by using a difference between an error voltage vector and a capacitor voltage vector, the error voltage vector being obtained between a sine-wave signal having a phase and an amplitude equivalent to a fundamental wave of an input voltage, the capacitor voltage vector being generated by charging and discharging a current flowing to an output side of the filter.

23. The control device for the matrix converter according to claim 20, wherein the matrix converter is configured to receive an alternating current as an input and to output a single-phase alternating current or a direct current.

24. The control device for the matrix converter according to claim 23, wherein the matrix converter comprises multiple power cells connected in series.

25. The control device for the matrix converter according to claim 20, wherein the matrix converter comprises multiple power cells connected in parallel.

* * * * *